(12) United States Patent
Wang et al.

(10) Patent No.: US 11,652,343 B1
(45) Date of Patent: May 16, 2023

(54) DEVICE FOR MONITORING ICING OF POWER TRANSMISSION LINES AND PREVENTING TOWER FROM FALLING DOWN

(71) Applicant: Northeast Electric Power University, Jilin (CN)

(72) Inventors: Dehong Wang, Jilin (CN); Yanzhong Ju, Jilin (CN); Yidan Ma, Jilin (CN); Yanting Liu, Jilin (CN)

(73) Assignee: Northeast Electric Power University, Jilin (CN)

( * ) Notice: Subject to any disclaimer, the term of this patent is extended or adjusted under 35 U.S.C. 154(b) by 0 days.

(21) Appl. No.: 17/982,637

(22) Filed: Nov. 8, 2022

(30) Foreign Application Priority Data

Dec. 23, 2021 (CN) .......................... 202111590919.7

(51) Int. Cl.
*H02G 7/04* (2006.01)
*G01L 5/04* (2006.01)

(52) U.S. Cl.
CPC .................. *H02G 7/04* (2013.01); *G01L 5/04* (2013.01)

(58) Field of Classification Search
CPC ..................................... H02G 7/04; G01L 5/04
See application file for complete search history.

(56) References Cited

U.S. PATENT DOCUMENTS

| 4,904,996 | A | * | 2/1990 | Fernandes | ............ | G01R 15/142 340/870.07 |
| 5,898,558 | A | | 4/1999 | Ostendorp | | |
| 9,784,766 | B2 | * | 10/2017 | Lindsey | ............... | G01R 31/085 |
| 10,386,542 | B2 | * | 8/2019 | Bai | .......................... | G01W 1/10 |
| 10,451,770 | B2 | * | 10/2019 | Godard | ................... | G01W 1/14 |
| 10,712,301 | B2 | * | 7/2020 | Bégin-Drolet | ......... | B64D 15/20 |

FOREIGN PATENT DOCUMENTS

| CN | 101521363 A | 9/2009 |
| CN | 103904603 A | 7/2014 |
| CN | 107317291 A | 11/2017 |
| CN | 111262205 B | 1/2021 |

* cited by examiner

*Primary Examiner* — Freddie Kirkland, III
(74) *Attorney, Agent, or Firm* — Mayer & Williams, PC; Stuart H. Mayer (57) ABSTRACT

Disclosed is a device for monitoring icing of a transmission line and preventing a tower from falling down, including a power transmission tower, an insulator string and a connecting mechanism; the connecting mechanism includes two connecting plates, and a monitoring-control connector and a damping component are arranged between the two connecting plates; sides of the two connecting plates are respectively provided with connecting grooves matched with two ends of the monitoring-control connector; the monitoring-control connector is provided with a monitoring component in signal connection with a master station; the two ends of the monitoring-control connector are respectively provided with load release components and are fixedly connected with the two connecting plates, and sides of the two connecting plates further from the monitoring-control component are fixedly connected with the power transmission tower and one end of the insulator string respectively, the other end of the insulator string is hung with wires.

7 Claims, 6 Drawing Sheets

DEVICE FOR MONITORING ICING OF POWER TRANSMISSION LINES AND PREVENTING TOWER FROM FALLING DOWN

CROSS-REFERENCE TO RELATED APPLICATIONS

This application claims priority to Chinese Patent Application No. 202111590919.7, filed on Dec. 23, 2021, the contents of which are hereby incorporated by reference.

TECHNICAL FIELD

The application relates to the field of power transmission line monitoring technology and load release, and in particular to a device for monitoring icing of power transmission lines and preventing a tower from falling down.

BACKGROUND

China has a vast territory, and the meteorological conditions are complex and changeable. The icing phenomenon of power transmission and transformation systems exists in many areas. The freezing rain or ice and snow on the power transmission lines gradually form an ice shell with an oval or egg-shaped cross section on the wires. After icing, the tower is subjected to excessive load and the accident of pole fall or tower fall is resulted. When the icing on the wires and lightning wires falls off locally, loads of the wires are uneven, and sleet jump and collision of wires are caused. Moreover, icing causes the wires to sag severely, and reduces the distance between the wires and the ground or crossing objects and consequently short circuits, grounding and other accidents are likely to happen. At the same time, due to the excessive load on the power transmission lines, some components of a power transmission tower bear large force and deform, thus threatening the overall safety of the power transmission tower, influencing the safe and reliable operation of the power system and leading to a great impact and economic loss.

Icing monitoring for conventional transmission lines mainly depends on regular inspection by inspectors and this inspection is time-consuming, inefficient, costly, inconvenient to monitor and leads to incomplete collected data. In the existing monitoring technology, there are also some problems, such as inaccurate judgment of icing thickness, which often leads to errors in judgment. After problems such as tower collapse and disconnection, a repair process is also complicated. Moreover, few related load release devices for existing power transmission towers are researched and developed, and when the power transmission lines are in high load states, the transmission tower is easily damaged or even collapsed.

Therefore, it is urgent to have a device for monitoring the icing of transmission lines and preventing a tower from falling down to solve the above problems.

SUMMARY

The objective of the present application is to provide a device for monitoring icing of power transmission lines and preventing a tower from falling down, so as to solve the problems existing in the prior art.

In order to achieve the above objective, the application provides the following scheme. The application provides a device for monitoring icing of power transmission lines and preventing a tower from falling down, including a power transmission tower, an insulator string and a connecting mechanism arranged between the power transmission tower and the insulator string, where the connecting mechanism includes two connecting plates, a monitoring-control connector is arranged in series between the two connecting plates, and connecting grooves matched with two ends of the monitoring-control connector are respectively arranged on sides of the two connecting plates; the two ends of the monitoring-control connector are respectively inserted into two connecting grooves, and the monitoring-control connector is provided with a monitoring component, where the monitoring component is in signal connection with a master station of a system, the two ends of the monitoring-control connector are respectively provided with load release components, and the two ends of the monitoring-control connector are fixedly connected with two connecting plates through the load release components; and sides of the two connecting plates far away from the monitoring-control connector are respectively fixed with the power transmission tower and one end of the insulator string, the other end of the insulator string is hung with wires and a damping component is arranged between the two connecting plates.

Optionally, the monitoring component includes a plurality of first tension sensors arranged in the monitoring-control connector, a plurality of first tension sensors are embedded in the monitoring-control connector, and a storage battery and data acquisition and online monitoring hosts are embedded in the monitoring-control connector, where the first tension sensors and the storage battery are electrically connected with the data acquisition and online monitoring hosts respectively, and the data acquisition and online monitoring hosts are in signal connection with a system host.

Optionally, the load release components include two bolts, top surfaces of the two ends of the monitoring-control connector respectively located in the connecting grooves are provided with connecting holes, top surfaces of the two connecting plates are provided with positioning holes, the positioning holes penetrate through the connecting grooves and correspond to the connecting holes, and the bolts are arranged in two groups of the respectively correspondingly arranged connecting holes and the positioning holes and bolts are connected with inner walls of the connecting holes and the positioning holes through threads.

Optionally, two ends of a top surface of the monitoring-control connector are respectively provided with release holes, and the two release holes are respectively located between the connecting holes and end surfaces closest to the connecting holes, axial directions of the release holes are parallel to axial directions of the connecting holes, the release holes are strip-shaped, and directions of the longest diameters of the release holes are parallel to a length direction of the monitoring-control connector.

Optionally, lengths of the monitoring-control connector between ends of the bolts and the release holes are L1, and $L1 \cdot T \cdot \tau = 80\%$ F.

Optionally, longest diameters L2 of the release holes are 80-120 mm.

Optionally, shortest distances L3 between ends of the release holes and end faces of the monitoring-control connector are set to be 1.2 times a diameter distance of the bolts.

Optionally, $\tau$ is a shear failure stress and F is an ultimate bearing capacity of the power transmission tower.

Optionally, a preset load of punching failure is 80% of the ultimate bearing capacity of the power transmission tower.

Optionally, the damping component includes two large-stiffness springs, the two large-stiffness springs are respectively arranged on both sides of the monitoring-control connector, and two ends of the two large-stiffness springs are fixedly connected with the sides of the two connecting plates.

The application has the following technical effects. Real-time monitoring and data transmission of the icing load is realized through long-distance wireless transmission to a master station of the system after the icing load is processed by the monitoring component, which is convenient to take effective measures to prevent in time, effectively predicts ice disaster accidents and effectively reduces disaster losses. When the icing load reaches the preset load, the icing load is released by releasing tension of the wires. When the load is released, due to the effect of the damping component, there is no large vibration or jump of the wires, the damage to the power transmission tower is effectively avoided and the safety performance of the power transmission tower is improved. After deicing, it is possible to quickly repair and restore only by replacing the monitoring-control connector. The method to replace the monitoring-control connector is the same as that of replacing insulator pieces and is convenient and quick.

BRIEF DESCRIPTION OF THE DRAWINGS

In order to more clearly explain the embodiments of the present application or the technical solutions in the prior art, the following will briefly introduce the drawings that need to be used in the embodiments. Obviously, the drawings in the following description are only some embodiments of the present application. For those of ordinary skill in art, other drawings can be obtained according to these drawings without any creative effort.

DETAILED DESCRIPTION OF THE EMBODIMENTS

The technical solutions in the embodiments of the present application will be clearly and completely described below with reference to the drawings in the embodiments of the present application. Obviously, the described embodiments are only part of the embodiments of the present application, but not all of them. Based on the embodiment of the present application, all other embodiments obtained by ordinary technicians in the field without creative labor are within the scope of the present application.

In order to make the above objectives, features and advantages of the present application more obvious and understandable, the present application will be explained in further detail below with reference to the drawings and detailed description.

Embodiment 1

With reference to FIGS. 1-5, the present application provides a device for monitoring icing of power transmission lines and preventing a tower from falling. The device for monitoring icing of power transmission lines and preventing a tower from falling down includes a power transmission tower 1 and an insulator string 2, and a connecting mechanism arranged between the power transmission tower 1 and the insulator string 2, where the connecting mechanism includes two connecting plates 3, a monitoring-control connector 4 is arranged in series between the two connecting plates 3, and connecting grooves matched with two ends of the monitoring-control connector 4 are respectively arranged on sides of the two connecting plates 3; the two ends of the monitoring-control connector 4 are respectively inserted into two connecting grooves, the monitoring-control connector 4 is provided with a monitoring component, and the monitoring component is in signal connection with a master station of a system; the two ends of the monitoring-control connector 4 are respectively provided with load release components, and the two ends of the monitoring-control connector 4 are fixedly connected with two connecting plates 3 through the load release components; sides of the two connecting plates 3 far away from the monitoring-control connector 4 are respectively fixed with the power transmission tower 1 and one end of the insulator string 2, the other end of the insulator string 2 is hung with wires, and a damping component is arranged between the two connecting plates 3.

Figure 1:
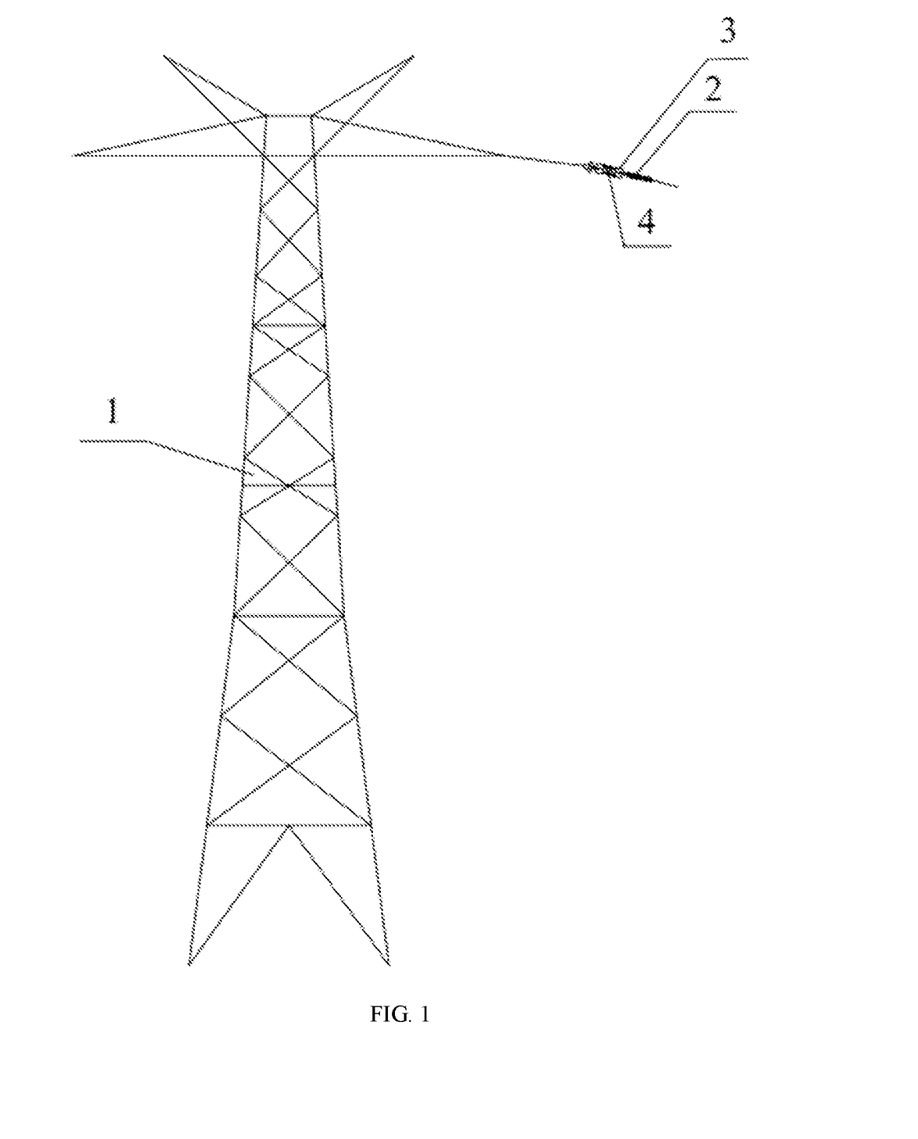
FIG. 1 is a schematic structural diagram of embodiment 1 of the present application.
Figure 2:
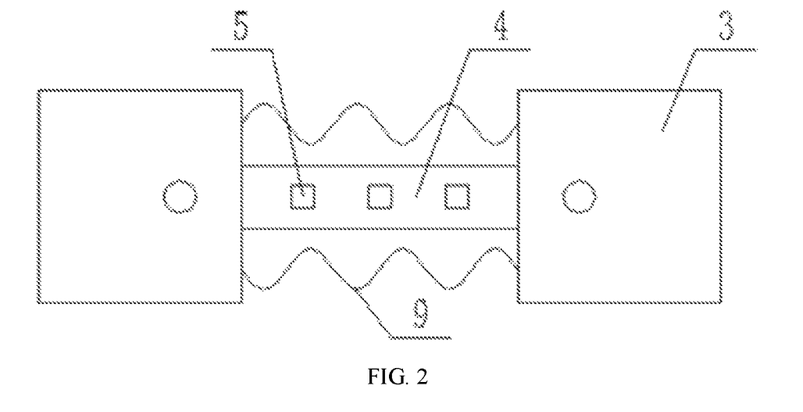
FIG. 2 is a plan view of embodiment 1 of the present application.
Figure 3:
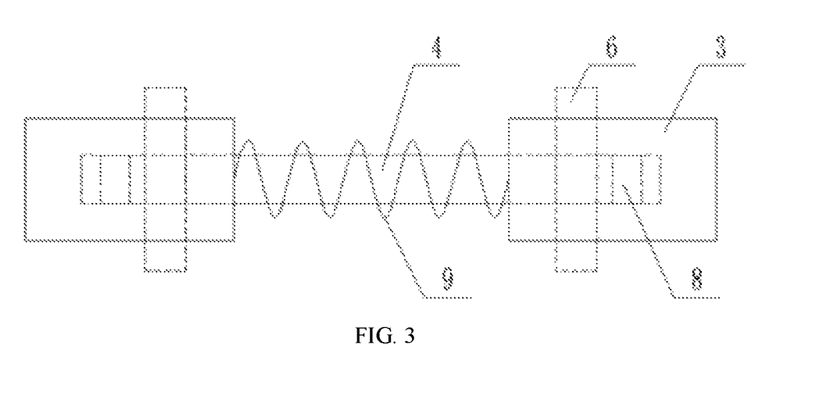
FIG. 3 is a side view of embodiment 1 of the present application.

According to the application, real-time monitoring and data transmission of the icing load is realized through long-distance wireless transmission to a master station of the system after the icing load is processed by the monitoring component, which is convenient to take effective measures to prevent in time, effectively predicts ice disaster accidents and effectively reduces disaster losses. When the icing load reaches the preset load, the icing load is released by releasing the tension of the wires. When the load is released, due to the effect of the damping component, there is no large vibration or jump of the wires, the damage to the power transmission tower 1 is effectively avoided and the safety performance of the power transmission tower 1 is improved. After deicing, it is possible to quickly repair and restore only by replacing the monitoring-control. The method to replace the monitoring-control connector is the same as that of replacing insulator pieces and is convenient and quick.

Figure 4:
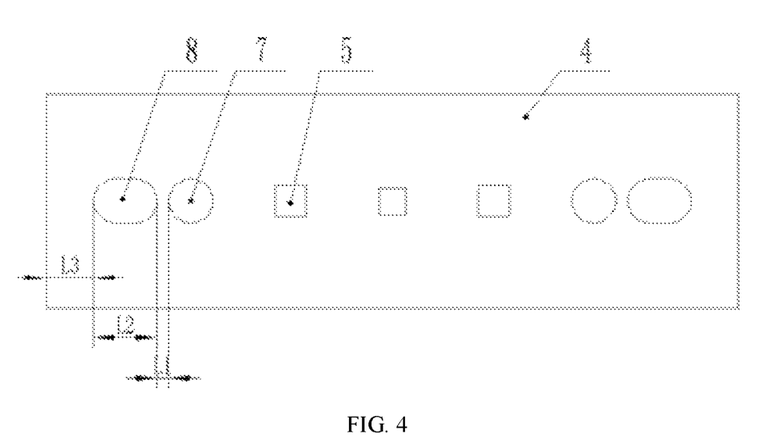
FIG. 4 is a structural diagram of a monitoring-control connector in embodiment 1 of the present application.
Figure 5:
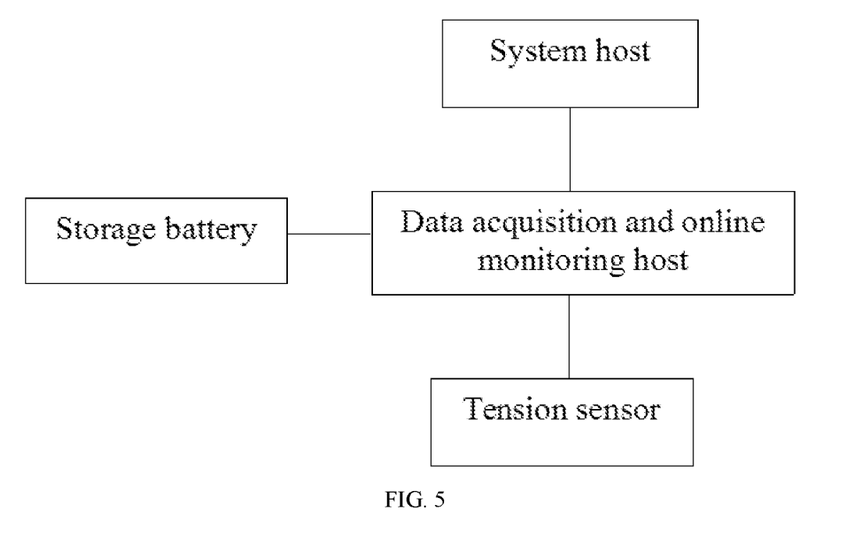
FIG. 5 is a structural diagram of a monitoring component in embodiment 1 of the present application.

In an embodiment, the monitoring component includes a plurality of first tension sensors 5 arranged in the monitoring-control connector 4, a plurality of first tension sensors 5 are embedded in the monitoring-control connector 4, and a storage battery and data acquisition and online monitoring hosts are embedded in the monitoring-control connector 4. The first tension sensors 5 and the storage battery are electrically connected with the data acquisition and online monitoring hosts respectively, and the data acquisition and online monitoring hosts are in signal connection with the system host.

There are three first tension sensors 5. When the power transmission lines are subjected to icing, the tension on the monitoring-control connector 4 varies, and a varied value is the tension of the icing on the monitoring-control connector 4. The ice weight is accurately monitored and tension sensors have good durability. Long-distance signal wireless transmission is realized through the storage battery and the data acquisition and online monitoring hosts in the monitoring-control connector 4.

When the system host cannot monitor the signal of the first tension sensors 5, the storage battery needs to be replaced.

In an embodiment, the load release components include two bolts 6, and top surfaces of the two ends of the monitoring-control connector 4 respectively located in the connecting grooves are provided with connecting holes 7. Top surfaces of the two connecting plates 3 are provided with positioning holes, and the positioning holes penetrate through the connecting grooves and correspond to the connecting holes 7. The bolts 6 are arranged in two groups of the respectively correspondingly arranged connecting holes 7 and positioning holes, and the bolts 6 are connected with inner walls of the connecting holes 7 and the positioning holes by threads.

Thicknesses of the connecting plates 3 are much larger than that of the monitoring-control connector 4, and in this way, it is ensured a broken part is on the monitoring-control connector 4 instead of on the connecting plates 3. The bolts 6 have functions of positioning the connecting plates 3 and the monitoring-control connector 4, and a thickness t of the monitoring-control connector 4 is obtained by calculation. At the same time, the sides of the two connecting plates 3 are provided with grooves according to the thickness and insertion depth of the monitoring-control connector 4, and the monitoring-control connector 4 is inserted into the two connecting plates 3 and fixed by the bolts 6.

In an embodiment, two ends of a top surface of the monitoring-control connector 4 are respectively provided with release holes 8, and the two release holes 8 are respectively located between the connecting holes 7 and end faces closest to the connecting holes 7. The axial directions of the release holes 8 are parallel to the axial directions of the connecting hole 7, and the release holes 8 are strip-shaped, and directions of the longest diameters of the release holes 8 are parallel to a length direction of the monitoring-control connector 4.

When an icing load reaches a preset load, the bolts 6 connecting the connecting plates 3 with the monitoring-control connector 4 are subjected to punching failure, and the bolts 6 slide along the release holes 8, and consequently tension of the wires is released and thus the load is released.

In an embodiment, the lengths of the monitoring-control connector 4 between the end of the bolts 6 and the release holes 8 are L1, and $L1 \cdot \tau = 80\% \, F$.

In an embodiment, the longest diameters L2 of the release holes 8 are 80-120 mm.

The longest diameters L2 of the release holes 8 are calculated according to the stress-sag relationship to determine a more accurate range.

In an embodiment, the shortest distances L3 between the end of the release holes 8 and the end faces of the monitoring-control connector 4 are set to be 1.2 times the diameter distance of the bolts 6.

In an embodiment, $\tau$ is shear failure stress and F is an ultimate bearing capacity of the power transmission tower.

In an embodiment, a preset load for punching failure is 80% of the ultimate bearing capacity of power transmission tower 1.

In an embodiment, the damping component includes two large-stiffness springs 9, the two large-stiffness springs 9 are respectively arranged on both sides of the monitoring-control connector 4, and two ends of the large-stiffness springs 9 are fixedly connected with the sides of the two connecting plates 3.

When the load is released, due to the effect of the large-stiffness springs 9, there is no large vibration or jump of the wires.

Embodiment 2

Figure 6:
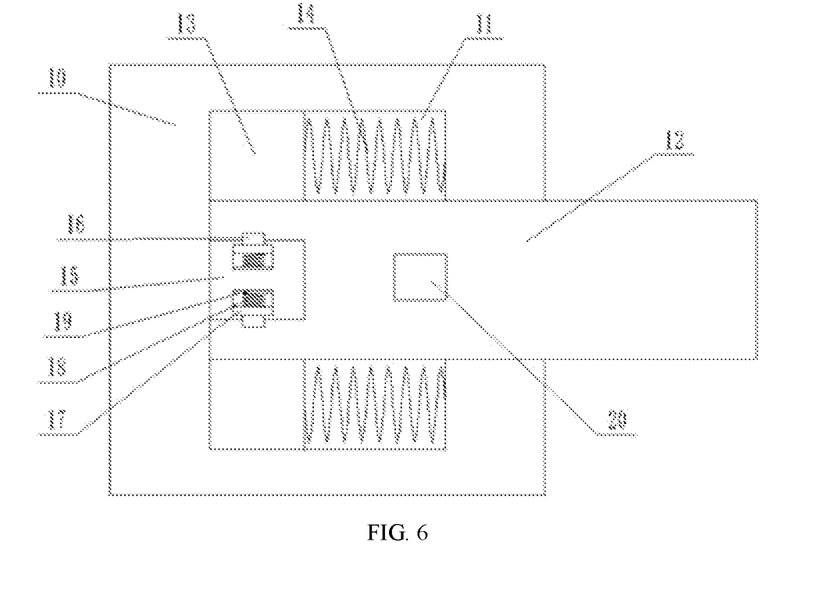
FIG. 6 is a structural diagram of embodiment 2 of the present application.

With reference to FIG. 6, in order to further improve the load release capacity according to the present application, the power transmission tower 1 is fixedly connected with a fixing block 10, an inner cavity 11 is formed in the fixing block 10, a communication hole is formed on one side of the inner cavity 11, and a release rod 12 is slidably contacted in the communication hole. One end of the release rod 12 is fixedly connected with one of connecting plates 3 close to the power transmission tower 1, and the other end of the release rod 12 is fixedly connected with a limiting plate 13, a peripheral wall of the limiting plate 13 is in sliding contact with an inner wall of the inner cavity 11. A plurality of damping springs 14 are arranged between a side of the limiting plate 13 and the inner wall of the inner cavity 11, an end face of the release rod 12 is provided with a fixing groove, and the fixing column 15 is arranged in the fixing groove. The fixing column 15 is circumferentially provided with a plurality of limiting cavities at equal intervals, and top surfaces of the limiting cavities are provided with limiting holes, fixing rods 16 are slidably contacted in the limiting holes, and an inner wall of the fixing groove is provided with clamping grooves matched with the fixing rods 16, and bottoms of the fixing rods 16 are fixedly connected with clamping plates 17. A top surface of each clamping plates 17 abuts against the top surfaces of the limiting cavities, a bottom surface of each clamping plate 17 is fixedly connected with one end of each return spring 18, the other end of each return spring 18 is fixedly connected with an electromagnetic sheet 19, each electromagnetic sheet 19 is electrically connected with an external power supply, and the release rod 12 is internally embedded with a second tension sensor 20. When the bolts 6 slide in the release holes 8, the second tension sensor 20 senses the rapidly varying tension due to the varied load. The external power supply is controlled to energize each electromagnetic sheet 19, each clamping plate 17 is attracted towards the direction of the inner cavity 11, so that the fixing rods 16 are separated from the clamping grooves, and the release rod 12 is released, thus further improving the load release capacity. Meanwhile, the damping springs 14 slow down a moving speed of the release rod 12, so as to avoid violent shaking of wires caused by the rapid release.

In the description of the present invention, it should be understood that the directions or positional relationships indicated by the terms "longitudinal", "transverse", "upper", "lower", "front", "rear", "left", "right", "vertical", "horizontal", "top", "bottom", "inner", "outer", etc. are based on the directions or positional relationships shown in the drawings, and are only for the convenience of describing the present invention, rather than indicating or implying that the device or element referred to must have a particular direction, be constructed and operate in a particular direction, and therefore should not be understood as limiting the invention.

The above-mentioned embodiments only describe the preferred mode of the application, but do not limit the scope of the application. On the premise of not departing from the design spirit of the application, all kinds of modifications and improvements made by ordinary technicians in the field to the technical scheme of the application shall fall within the scope of protection defined by the claims of the application.

What is claimed is:

1. A device for monitoring icing of power transmission lines and preventing a tower from falling down, comprising a power transmission tower, an insulator string and a connecting mechanism arranged between the power transmission tower and the insulator string; the connecting mechanism comprises two connecting plates, a monitoring-control connector is arranged in series between the two connecting plates, and connecting grooves matched with two ends of the monitoring-control connector are respectively arranged on sides of the two connecting plates; the two ends of the monitoring-control connector are respectively inserted into the two connecting grooves, and the monitoring-control connector is provided with a monitoring component; the monitoring component is in signal connection with a master station of a system, the two ends of the monitoring-control connector are respectively provided with load release components, and the two ends of the monitoring-control connector are fixedly connected with the two connecting plates through the load release components; and sides of the two connecting plates far away from the monitoring-control connector are respectively fixed with the power transmission tower and one end of the insulator string, the other end of the insulator string is hung with wires and a damping component is arranged between the two connecting plates;

- the load release components comprise two bolts, top surfaces of the two ends of the monitoring-control connector respectively located in the connecting grooves are provided with connecting holes, top surfaces of the two connecting plates are provided with positioning holes, the positioning holes penetrate through the connecting grooves and correspond to the connecting holes, and the bolts are arranged in two groups of the respectively correspondingly arranged connecting holes and the positioning holes, and bolts are connected with inner walls of the connecting holes and the positioning holes through threads;
- two ends of a top surface of the monitoring-control connector are respectively provided with release holes, and the two release holes are respectively located between the connecting holes and end surfaces closest to the connecting holes, axial directions of the release holes are parallel to axial directions of the connecting holes, the release holes are strip-shaped, and directions of longest diameters of the release holes are parallel to a length direction of the monitoring-control connector;
- when an icing load reaches a preset load, the bolts connecting the connecting plates with the monitoring-control connector are subjected to punching failure, and the bolts slide along the release holes, and consequently tension of the wires is released and thus the load is released.

2. The device for monitoring icing of power transmission lines and preventing a tower from falling down according to claim 1, wherein the monitoring component comprises a plurality of first tension sensors arranged in the monitoring-control connector, a plurality of first tension sensors are embedded in the monitoring-control connector, and a storage battery and data acquisition and online monitoring hosts are embedded in the monitoring-control connector; the first tension sensors and the storage battery are electrically connected with the data acquisition and online monitoring hosts respectively, and the data acquisition and online monitoring hosts are in signal connection with a system host.

3. The device for monitoring icing of power transmission lines and preventing a tower from falling down according to claim 1, wherein lengths of the monitoring-control connector between ends of the bolts and the release holes are L1, and $L1 \cdot T \cdot \tau = 80\% \, F$, where i is a shear failure stress, F is an ultimate bearing capacity of the power transmission tower, and t is a thickness of the monitoring-control connector.

4. The device for monitoring icing of power transmission lines and preventing a tower from falling down according to claim 3, wherein longest diameters L2 of the release holes are 80-120 millimeters.

5. The device for monitoring icing of power transmission lines and preventing a tower from falling down according to claim 4, wherein shortest distances L3 between ends of the release holes and end faces of the monitoring-control connector are set to be 1.2 times a diameter distance of the bolts.

6. The device for monitoring icing of power transmission lines and preventing a tower from falling down according to claim 3, wherein a preset load of punching failure is 80 percent of the ultimate bearing capacity of the power transmission tower.

7. The device for monitoring icing of power transmission lines and preventing a tower from falling down according to claim 1, wherein the damping component comprises two large-stiffness springs, the two large-stiffness springs are respectively arranged on both sides of the monitoring-control connector, and two ends of the two large-stiffness springs are fixedly connected with the sides of the two connecting plates.

* * * * *